(12) United States Patent
Gish

(10) Patent No.: US 9,538,127 B2
(45) Date of Patent: Jan. 3, 2017

(54) REMOTE CUSTOMER ASSISTANCE SYSTEM HAVING TWO-WAY AUDIO AND VIDEO INTERFACE

(71) Applicant: Denison Parking, Inc., Indianapolis, IN (US)

(72) Inventor: Kurt A. Gish, Indianapolis, IN (US)

(73) Assignee: Denison Parking, Inc., Indianapolis, IN (US)

( * ) Notice: Subject to any disclaimer, the term of this patent is extended or adjusted under 35 U.S.C. 154(b) by 167 days.

(21) Appl. No.: 14/504,748

(22) Filed: Oct. 2, 2014

(65) Prior Publication Data

US 2015/0097917 A1 Apr. 9, 2015

Related U.S. Application Data

(60) Provisional application No. 61/886,969, filed on Oct. 4, 2013.

(51) Int. Cl.
*H04N 7/14* (2006.01)
*G06Q 30/00* (2012.01)
*G06Q 20/18* (2012.01)

(52) U.S. Cl.
CPC .............. *H04N 7/141* (2013.01); *G06Q 20/18* (2013.01); *G06Q 30/016* (2013.01)

(58) Field of Classification Search
CPC ....................................................... H04N 7/14
USPC ................... 348/14.01, 14.07, 14.12, 14.11, 14.04, 348/14.05
See application file for complete search history.

(56) References Cited

U.S. PATENT DOCUMENTS

| | | | |
|---|---|---|---|
| 4,603,390 A | 7/1986 | Mehdipour et al. |
| 4,703,164 A | 10/1987 | von Ballmoos |
| 5,034,739 A | 7/1991 | Gruhl |
| 5,168,354 A | 12/1992 | Martinez et al. |
| 5,482,139 A | 1/1996 | Rivalto |
| 5,614,892 A | 3/1997 | Ward, II et al. |
| 5,648,906 A | 7/1997 | Amirpanahi |
| 5,710,557 A | 1/1998 | Schuette |
| 5,737,710 A | 4/1998 | Anthonyson |
| 5,745,052 A | 4/1998 | Matsuyama et al. |
| 5,751,973 A | 5/1998 | Hassett |
| 5,770,845 A | 6/1998 | Hjelmvik |
| 5,838,314 A | 11/1998 | Neel et al. |
| 5,845,268 A | 12/1998 | Moore |
| 5,905,247 A | 5/1999 | Ilen |
| 5,940,481 A | 8/1999 | Zeitman |
| 6,032,126 A | 2/2000 | Kaehler |
| 6,188,328 B1 | 2/2001 | Ho |
| 6,329,930 B1 | 12/2001 | Parsadayan |
| 6,340,935 B1 | 1/2002 | Hall |
| 6,505,774 B1 | 1/2003 | Fulcher et al. |
| 6,564,380 B1 | 5/2003 | Murphy |
| 6,865,539 B1 | 3/2005 | Pugliese, III |

(Continued)

*Primary Examiner* — Olisa Anwah
(74) *Attorney, Agent, or Firm* — Barnes & Thornburg LLP

(57) ABSTRACT

Disclosed is a system and method for providing two-way audio and video communications in a remote customer assistance environment. Upon initiation of an audio communications session using an audio server, separate video communications are established between the devices in a customer terminal and a remote attendant workstation. The dial plan of the audio server may used to add additional information to the incoming audio call request for use by the attendant workstation in initiating the video communications sessions.

18 Claims, 3 Drawing Sheets

(56) References Cited

U.S. PATENT DOCUMENTS

| | | | |
|---|---|---|---|
| 7,432,951 B1* | 10/2008 | Burritt | H04N 7/147 348/14.01 |
| 7,711,601 B2* | 5/2010 | Pratt | G06Q 20/10 348/61 |
| 8,582,726 B2* | 11/2013 | Laiho | H04N 7/148 348/14.02 |
| 8,831,970 B2 | 9/2014 | Weik, III et al. | |
| 9,118,802 B2* | 8/2015 | Smith | G07C 3/00 |
| 2001/0001321 A1 | 5/2001 | Resnick et al. | |
| 2002/0032601 A1 | 3/2002 | Admasu et al. | |
| 2002/0087413 A1 | 7/2002 | Mahaffy et al. | |
| 2003/0004792 A1 | 1/2003 | Townzen et al. | |
| 2003/0032601 A1 | 2/2003 | Kreuter et al. | |
| 2007/0257983 A1* | 11/2007 | Miali | H04L 29/06027 348/14.11 |
| 2010/0250345 A1 | 9/2010 | Pratt et al. | |

\* cited by examiner

REMOTE CUSTOMER ASSISTANCE SYSTEM HAVING TWO-WAY AUDIO AND VIDEO INTERFACE

CROSS-REFERENCE TO RELATED APPLICATION

This application claims the benefit of U.S. Provisional Application No. 61/886,969 filed Oct. 4, 2013, which is hereby incorporated by reference.

BACKGROUND

Remote customer assistance systems, such as those used in self-service environments (parking garages, train stations, automated bank teller machines, storage facilities, etc.), have traditionally provided for audio communications between the customer and a live remotely-located attendant through the use of a digital audio intercom. Reliability and performance of such systems can be critical, since there typically are no company personnel available at the customer location to provide in-person assistance. In recent years, some systems have begun to add digital video transmission capability in addition to audio in order to provide a more personal experience for the customer. These systems typically utilize a single device to encode and decode both the audio and video signals. However, in such systems, problems with the audio signal being processed can also cause the associated video signal to be interrupted or delayed. This interruption can be frustrating to the customer and may even negate the value of the added video functionality. Systems and methods are therefore needed which provide two-way audio and video communications for remote customer assistance, while at the same time maintaining reliability and performance.

SUMMARY

A customer service communication system is disclosed comprising a customer terminal including a customer audio interface adapted to send customer audio data over a digital network. The customer audio interface may be coupled to the digital network and can be accessed from the digital network using a customer audio network address associated with the customer audio interface. The customer terminal may also include a customer video camera adapted to output customer video data to the digital network. The customer video camera can be coupled to the digital network making the customer video camera accessible from the digital network using a customer camera network address associated with the customer video camera. The customer terminal may further include a customer video display module which may be adapted to accept attendant video data received from the digital network. The customer video display module may be coupled to the digital network allowing the customer video display module to be accessible from the digital network using a customer display network address associated with it.

The customer service communication system may also include an attendant workstation located remote from the customer terminal that can include an attendant audio interface which may be adapted to send attendant audio data over the digital network. The attendant audio interface may be coupled to the digital network and accessible from the digital network using an attendant audio network address associated with the attendant audio interface. An attendant video camera adapted to output the attendant video data to the digital network may also be included in the attendant workstation. The attendant video camera may be coupled to the digital network and may also be accessible from the digital network using an attendant camera network address associated with the attendant video camera. The attendant workstation may also include an attendant video display module adapted to accept an incoming video signal received from the digital network. The attendant video display module may be coupled to the digital network making it accessible from the digital network using, for example, an attendant display network address associated with the attendant video display module.

The customer service communication system may further comprise an audio communications server coupled to the digital network that may be adapted to initiate an audio communication session using the digital network. The audio communication session can be configured to direct customer audio data to the attendant audio interface, and/or attendant audio data to the customer audio interface. The attendant workstation may be adapted to direct the customer video camera to send the customer video data to the attendant video display module for the digital network once the audio communication session has been initiated. Conversely, the attendant workstation may be adapted to direct the attendant video camera to send the attendant video data to the customer video display module using the digital network when the audio communication session has been initiated.

The customer service communication system disclosed herein may also be characterized as comprising a customer terminal, the customer service terminal including a network-addressable customer audio intercom module adapted to provide two-way audio communication over a digital network, a network-addressable customer video camera adapted to output a first video signal to the digital network, and a network-addressable customer video display module adapted to receive and display a second video signal from the digital network. The communication system also comprises an attendant workstation located remote from the customer terminal and including an attendant computer. The attendant computer includes a network-addressable audio intercom module adapted to provide two-way audio communication over the digital network and a network-addressable attendant video display module adapted to receive and display the first video signal from the digital network. The attendant workstation further includes a network-addressable attendant video camera adapted to output the second video signal to the digital network and an audio communications server connected to the digital network.

The audio communications server may be adapted to relay two-way audio communications between the customer terminal and the attendant workstation. The attendant workstation can direct the customer video camera to send the first video signal to the attendant video display module via the digital network upon the initiation of an audio communication session between the customer terminal and the attendant workstation. The attendant workstation can be configured to direct the attendant video camera to send the second video signal to the customer video display module via the digital network. This can occur when an audio communication session has been initiated.

This summary is provided to introduce a selection of concepts in a simplified form that are described in further detail in the detailed description and drawings contained herein. This Summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings contained herein.

DETAILED DESCRIPTION

Figure 1:
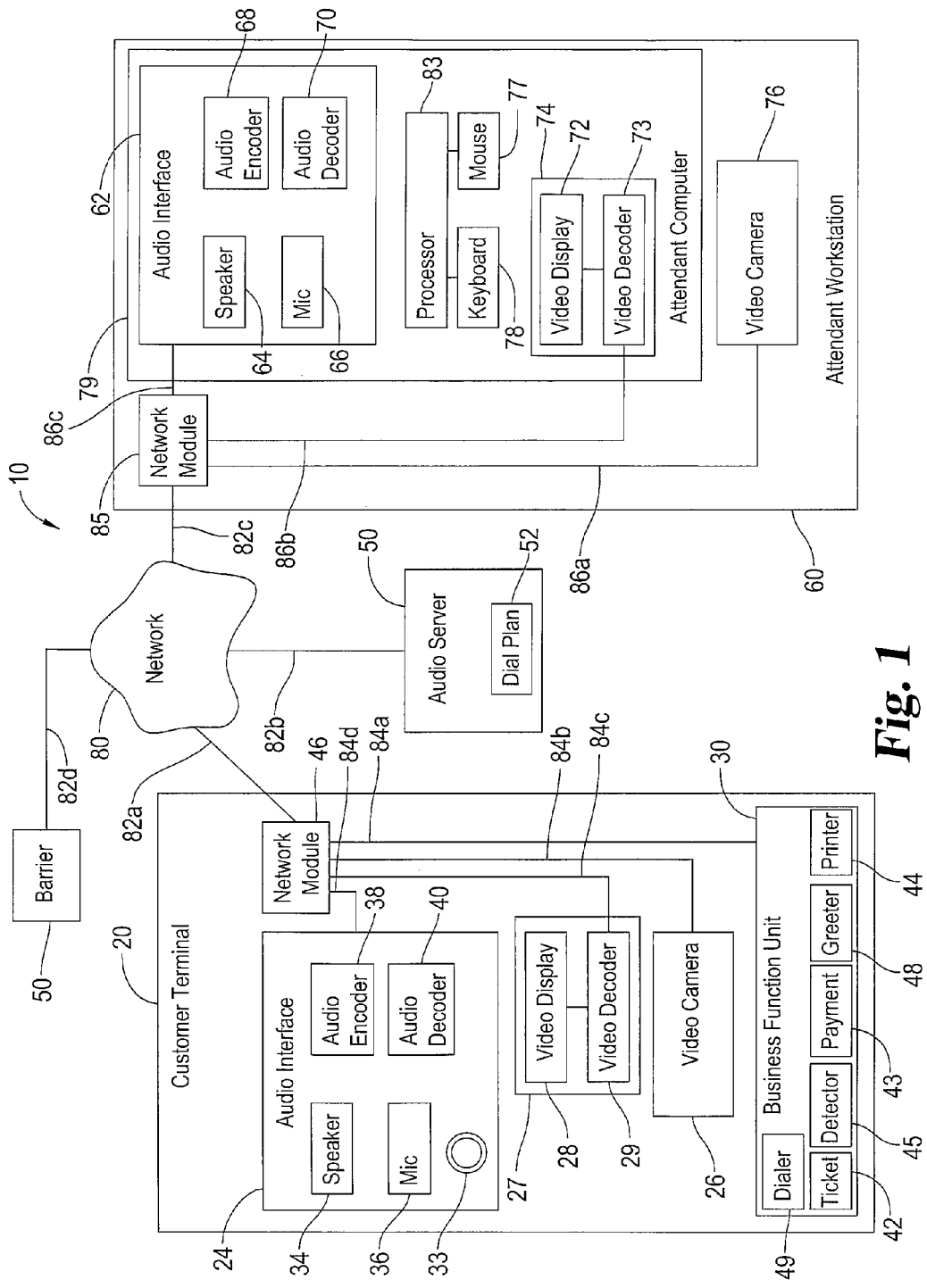
FIG. 1 is a diagrammatic view of a system for providing two-way audio and video communications.

For the purposes of promoting an understanding of the principles of the invention, reference will now be made to the examples illustrated in the drawings and specific language will be used to describe the same. It will nevertheless be understood that no limitation of the scope of the invention is thereby intended. Any alterations and further modifications in the described examples, and any further applications of the principles of the invention as described herein are contemplated as would normally occur to one skilled in the art to which the invention relates.

The present disclosure, through reference to the accompanying figures, describes a system and associated method that allows two-way audio and video communication between a customer terminal and a remotely located attendant workstation. The system uses an audio server to initiate audio communication sessions relaying audio communications between the customer terminal and the attendant workstation. Upon initiation of an audio communications session, a separate video communications session can be established between the customer terminal and the attendant workstation. This may mean bypassing the audio communications server which may result in increased signal quality and reliability because interruptions in the audio communications may not interfere with video signals being transmitted and received between the customer terminal and the attendant workstation.

FIG. 1 is a diagrammatic view of a system 10 illustrating exemplary components of the disclosed system. Other components may be included as well. System 10 includes a customer terminal 20, an audio server 50, and an attendant workstation 60. Digital network 80 may couple together the customer terminal 20, audio server 50, and attendant workstation 60 over network pathways 82*a*-82*d* as shown. Multiple customer terminals like customer terminal 20 may be coupled together with each other, with audio server 50, or with attendant workstation 60. For example, customer terminals 20 may be located in various remote locations, such as parking garages, automated bank teller machines (ATM) locations or other self-service environments where occasional assistance from a remote attendant or help-desk is needed. Multiple attendant workstations like workstation 60 may be included in system 10 coupled to each other, to audio server 50, or customer terminal 20. Multiple attendants or help-desk operators may be located in a central monitoring center, or in multiple independent monitoring centers remote from each other, from customer terminal 20, and audio server 52.

Customer terminal 20 may be implemented as a stand alone unit having associated business functions. Examples of associated business functions include, but are not limited to, an automated self-pay terminal in a parking garage or train station, an ATM machine, or a secured entry point to a building to name just a few. As shown, the customer terminal 20 includes an audio interface 24, a video camera 26, and a video display 28. These components may also be referred to as customer audio interface 24, customer video camera 26, customer video decoder 29, and customer video display 28 respectively. Video display 28, and video decoder 29 may be considered together as component parts of a video display module 27 which may also be characterized as a customer video display module 27.

A business function unit 30 may be optionally included as part of customer terminal 20 for facilitating various business functions. For example, in the case where the customer terminal 20 is located in a parking garage, business function unit 30 may optionally include a ticket reader 42, a payment acceptor 43, and receipt printer 44. The business function unit may also include a customer detector 45 for detecting the presence of a customer. Customer detector 45 may be implemented by any suitable device such as a sensor or switch sensitive to the pressure of a customer or a customer's vehicle. Customer detector 45 may also include an optical detector or sensor and light source which, for example, may indicate the presence of a customer when the customer obstructs the passage of the beam of light passing from the light source to the optical detector or sensor. Other types of customer detectors may include magnetic field sensors sensing change in a magnetic field caused by the customer's vehicle passing in close proximity to the sensor, or a Radio Frequency Identification (RFID) sensor detecting the close proximity of an RFID enabled access card or other token presented by the customer. Any suitable device or system capable of detecting the presence of a customer is envisioned. The customer detector 45 may be part of customer terminal 20, part of business function unit 30, or both.

The customer terminal 20 may also include an automatic announcement generator 48 and/or an automatic dialer 49. Upon detecting the presence of a customer at the customer terminal 20, announcement generator 48 may automatically generate an announcement to greet the customer. Such an announcement may be audible emanating from speaker 34 of audio interface 24. In another example, the automatically generated greeting may be in the form of a video or animation displayed on video display 28. Similarly, automatic dialer 49 may also automatically initiate an audio communication session as disclosed herein by, for example, automatically dialing an attendant. The customer terminal 20 may also be configured to control equipment external to the customer terminal 20, such as a movable barrier 50 such as a gate or garage door controlling access to a parking garage. Any suitable combination of ticket reader 42, payment acceptor 43, receipt printer 44, customer detector 45, announcement generator 48, dialer 49, and barrier 50 may be included in, or coupled to, customer terminal 20 and/or business function unit 30. These individual units need not necessarily be enclosed within the same enclosure as either customer terminal 20, or business function unit 30. For example, barrier 50 may be a separate unit coupled to network 80 by network pathway 82*d*.

Many of the components in system 10 may be coupled in some manner to network 80. Network 80 may be a digital network using any suitable network communication techniques or protocols to relay datagrams across network 80. One example of such a communication protocol is Internet Protocol (IP). Network 80 may in fact be made up of many other smaller networks. For example, customer terminal 20 may be characterized as both being part of network 80, and as being its own separate network of devices coupled to network module 46 through internal network pathways

84*a*-84*c*. Network module 46 may be configured to direct or route data from one connected device such as customer detector 45 to another separate connected device such as video camera 26 without the data passing over network 80 through a network pathway 82. Network module 46 may therefore be operable to segregate network 80 into a separate subnetworks with one subnetwork including pathways 82*a*-82*c* and a separate subnetwork including pathways 84*a*-84*c* which may be defined by customer terminal 20. Network module 46 may include, for example, software or hardware programmed to operate network module 46 as a network router, a network switch, a network firewall, a network hub, or other similar network device.

Network attached components may be accessed by one another directly or in concert with other network attached components via network 80. Individual networked attached components may be "network addressable" which is to say such components may accept or be assigned a network address or network identifier that may be unique to other devices coupled to network 80. Once associated with this address, components in customer terminal 20, and any other components coupled to network 80 may be accessible via the network by this address. Devices such as network module 46 may also be optionally included for coordinating, routing, or transmitting data from the network addressable components of the customer terminal 20 to the other components in the system 10 via network 80. Because each component coupled to network 80 can have a separate network address or other network identifier associated with it, individual components may be remote from one another. The components of customer terminal 20 or attendant workstation 60 may be contained within the same enclosure, may be in separate enclosures some physical distance apart, or may be separated by hundreds of feet, tens of miles, or more. For example, customer detector may be positioned at an entrance to a parking garage, while customer video display module 27 and customer audio interface 24 may be in a separate enclosure in another part of the garage over 50 feet away. Business function unit 30, if present, may be physically located in a separate building two blocks away, or across town, or in another state. Attendant workstation 60 may be arranged similarly with various components physically separated by any suitable distance.

Network addresses can be assigned or associated automatically as individual components may be configured to send requests via network 80 requesting a network address be assigned by a network address authority coupled to network 80. In one example, network addressable components may send Dynamic Host Configuration Protocol (DHCP) requests to a DHCP server coupled to network 80. The DHCP server may then send back responses to each requesting component thereby providing unique separate network addresses corresponding to the individual network addressable devices. In one example, customer audio interface 24, customer video camera 26, and customer video display module 27, may receive separate individual network addresses from the network address authority allowing these components to be separately accessible via digital network 80. Thus customer audio interface 24 may have a unique customer audio network address assigned to it, customer video camera 26 may have its own unique customer camera network address assigned to it, and customer video display module 27 may also have its own unique customer display network address. As illustrated in FIG. 1, other combinations are possible such as a video decoder 29 may have a customer video decoder network address, network module 46 may have a customer network module network address, barrier 50 may have a customer barrier network address, and business function unit 30 may have a customer business function network address, and so forth. These various network addresses may be unique for all components communicating via network 80.

With respect to the construction of customer terminal 20, customer terminal 20 may be enclosed completely or partially within an enclosure. Such an enclosure may be configured to seal making the enclosure impervious to various foreign substances such as water, dust, high-pressure steam, or the air outside the enclosure. Such an enclosure may also be configured to resist impact from external forces such as may occur when the enclosure is struck by a vehicle or the target of vandalism. The enclosure may include a locking device or other similar device for controlling access to the container via a selectively closeable opening such as an access panel or door. One example of such an enclosure is an enclosure carrying an IP-65 rating for ingress protection.

Audio interface 24 may include an intercom unit having a call button 33, speaker 34, microphone 36, audio encoder 38 and audio decoder 40. The call button 33, speaker 34 and microphone 36 may be incorporated within the audio interface 24 or provided as separately connected components with individual connections to network 80. These individual connections my pass through network module 46 like the connections illustrated in FIG. 1 connecting video camera 26 or video decoder 29 to network 80. Speaker 34 and microphone 36 may be separate units, or they may optionally be implemented as a single transducer for both accepting audible input and converting it to a digital or analog signal, and for accepting a digital or analog signal and converting it to audible output respectively. The audio interface 24 may comprise a network addressable unit capable of transmitting and receiving digital audio data over the network 80, such as the IP7 family of intercoms commercially available from Digital Acoustics LLC of 37 Sherwood Terrace, Bldg 111 Lake Bluff, Ill. 60044 U.S.A.

One example of audio interface 24 is capable of relaying audio using the Internet Protocol (IP). Any suitable digital or analog network protocol or data format may be used. The audio decoder 38 may receive incoming audio data as digital datagrams or other signals from network 80 and may convert the signals to a format suitable for amplification and/or output to the speaker 34. Conversely, the audio encoder may convert raw audio signals from the microphone and other circuitry to a digital format suitable for transmission over network 80. For example, audio interface 24 may optionally be implemented as a desktop, laptop, or tablet computing device or computer with the audio interface functionality provided through software within the computer.

Video camera 26 may comprise a digital video camera which may be capable of transmitting digital video signals, such as the Axis P1214 Network Camera commercially available from Axis Communications, Inc. of 300 Apollo Drive Chelmsford, Mass. 01824, U.S.A. The video camera 26 may be positioned within the terminal 20 and arranged and configured to capture a video image of the customer during use. The video camera 28 may optionally include an auxiliary input for receiving non-video data, such as a stream of alphanumeric characters encoded in any suitable format which may be output by the video camera 28 to network 80 along with the video data. One example of such a format is text information encoded using the American Standard Code for Information Interchange (ASCII). Other examples of suitable character encoding schemes include any one of the Universal Character Set (UTF) transformation formats such as UTF-8, UTF-16, UTF-32, and the like.

Video camera 26 may also include an analog camera with a suitable analog to digital converter.

Video display 28 may be included with the customer terminal 20 to allow the customer to view a video image of the remotely located attendant during use. The display 28 may include any suitable video display, such as a cathode ray tube (CRT), or a liquid crystal display (LCD) or other display device using any suitable display method or technology. Video decoder 29 optionally comprises a network addressable digital video decoding device. On example of such a device is the Axis P7701, commercially available from Axis Communications, Inc. The video decoder 29 may be configured to receive digital video signal data from the attendant workstation 60, convert the signals to a format accepted by the display 28, and transmit the signals to the display 28 for viewing by the customer.

Attendant workstation 60 may be configured like customer terminal 20 in many respects and may include an audio interface 62, video display 72, video decoder 73, and video camera 76. These components may also be referred to as attendant audio interface 62, attendant video display 72, attendant video decoder 73, and attendant video camera 76 respectively. Video display 72, and video decoder 73 may be considered together as component parts of a video display module 74, which may also be characterized as an attendant video display module 74. The audio interface 62 may be like audio interface 24, or may be another suitable device for sending, receiving, encoding, and/or decoding digital or analog audio data or signals. In certain embodiments, the audio interface 62 may be included in, or perhaps coupled to, an attendant desktop or laptop computer 79 having functionality in addition to the intercom function. Speaker 64 and microphone 66 may be included as well to allow audio communication with the customer audio interface 24. Audio encoder 68 and decoder 70 may be similar to audio encoder 38 and decoder 40, respectively. Like audio encoder 38 and decoder 40, encoder 68 and decoder 70 may be implemented as devices separate from computer 79 and coupled to it, or they may be optionally implemented in software within the computer 79 and may use a speaker 64 and microphone 66 which may be mounted on or in computer 79.

Video decoder 73 may be included and may include a network addressable unit which may function like video decoder 29 to convert digital video data received from network 80 to a format suitable for output to video display 72. Video camera 76 may be like video camera 26 and may include, or operate as, a network addressable unit positioned to capture a video image of the attendant during use. Network module 85 may be similar to network module 46 and may function to relay data from one or more of the network addressable components of the attendant workstation 60 to the other components in the system 10 via network 80. Network module 85 may segment network 80 into a subnetwork like network module 46 having network paths 86a-86c used by attendant workstation 60. User input devices, such as keyboard 78 and mouse 77, are provided to allow the attendant to control and otherwise interact with the attendant workstation 60.

Audio Server 50 may include a computer with memory and a processor configured to receive and transmit digital audio signals for two-way audio communications. The dial plan configuration module may optionally be implemented in software stored in memory in the audio server 50. In one example, the audio server 50 is configured to operate using the Session Initiation Protocol (SIP) to receive and transmit the digital audio signals and/or function as a digital Private Branch Exchange (PBX). The audio server may also be configured to manage the incoming and outgoing audio connections using a dial plan configuration module 52. Audio server 50 may use configuration data in dial plan 52 to initiate a flow of audio data over network 80 from customer audio encoder 40 or audio interface 24 to attendant audio decoder 70 or audio interface 62. Conversely, audio server 50 may initiate a reverse flow of audio data from attendant audio encoder 68 or audio interface 62 to customer audio decoder 40 or audio interface 34. This flow of audio data between customer audio interface 24 and attendant audio interface 62 may pass through audio server 50, or may be arranged by audio server 50 and then may pass over network 80 without further intervention from audio server 50. In addition to routing audio signals between the customer terminal 20 and the attendant terminal 60, the dial plan module 52 may also be programmed to relay additional information related to the customer terminal components to the attendant workstation 60. For example, audio server 50 and dial plan 52 may pass additional information to attendant workstation 60 that includes data about how to begin an exchange of video data from customer video camera 26 to attendant video decoder 73, and conversely from attendant video camera 76 to customer video decoder 29. Such an exchange may be organized after the audio transmission between customer terminal 20 and attendant workstation 60 has been initiated and may be maintained separately as a separate flow of video data where datagrams carrying the video data over network 80 do not also carry audio data and where datagrams carrying audio data do not also carry video data. The functionality for adding additional information to the initial audio call request may be implemented in software stored within the audio server 50, such as within the dial plan module 52. In another example, the additional information may be added by software residing within the attendant workstation computer 79.

Figure 2:
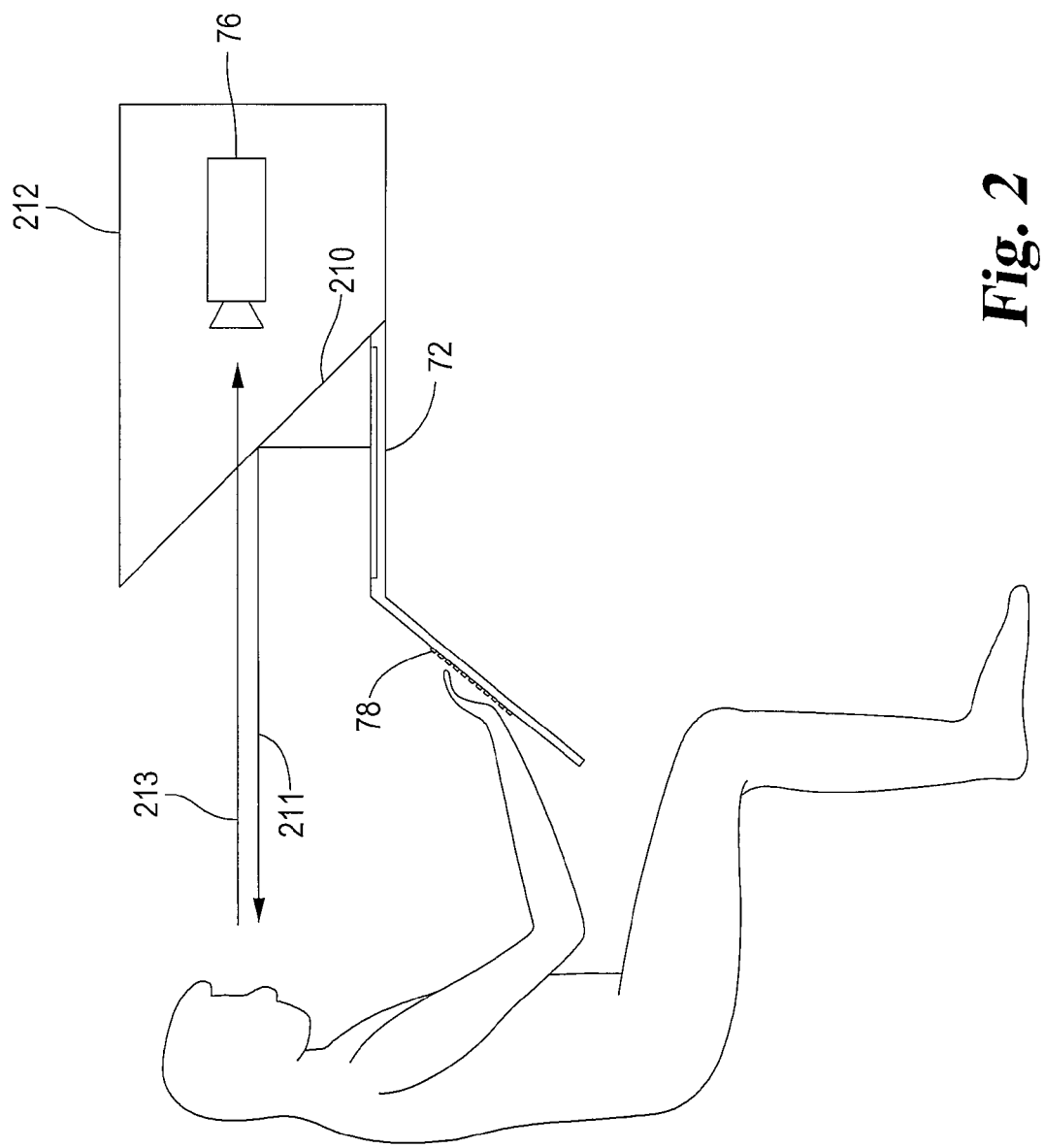
FIG. 2 is a diagrammatic view of on example of an attendant workstation illustrated in FIG. 1.

FIG. 2 illustrates one example of attendant workstation 60 with additional details. In FIG. 2, attendant workstation 60 incorporates a beam splitter 210 arranged and configured to display a video image output by attendant video display 72 in front of a lens of attendant video camera 76. Such an arrangement allows better simulated direct eye contact between a customer and an attendant using attendant workstation 60. As shown, the video display 72 is oriented in an upward-facing manner in order to project the customer image from the display 72 onto the beam splitter 210. The beam splitter 210 may include a one-way mirror which may be angled in order to direct the displayed image toward the eyes of the attendant as indicated by arrow 211. The video camera 76 can be positioned behind the beam splitter 210 and facing the attendant, thereby capturing a video image of the attendant as indicated by arrow 213. This arrangement allows the attendant to view a live video image of the customer's face while looking directly into the lens of the video camera 76 better simulating direct eye contact, as opposed to looking at a video display which is laterally offset from the video camera creating the impression to the customer that the attendant is never making eye contact. The video camera may optionally be mounted inside a hood 212 for enhancing the beam splitting effect or for reducing or eliminating glare or other stray light from unwanted light sources.

Figure 3:
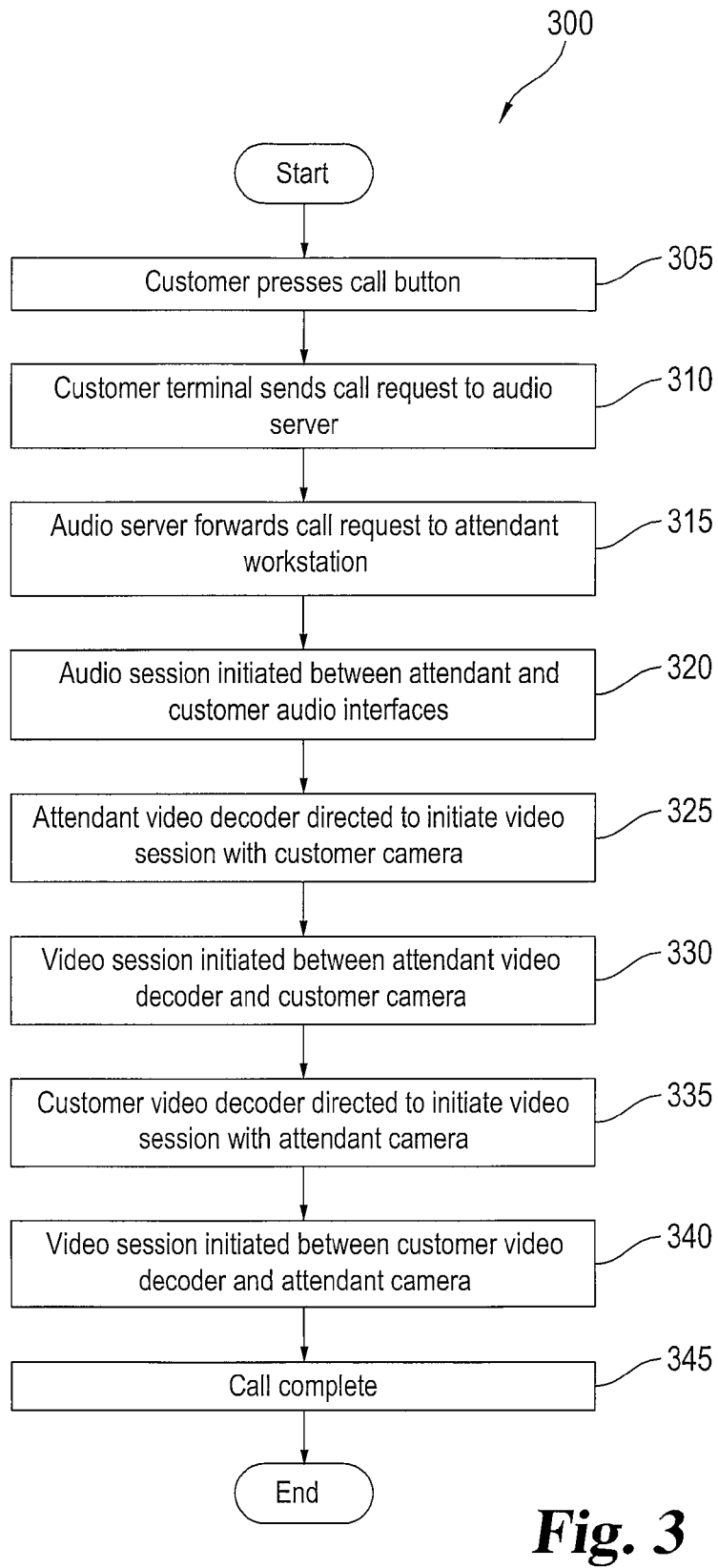
FIG. 3 is a flowchart showing one set of actions a system like the one illustrated in FIG. 1 may perform when providing two-way audio and video communications.

Turning now to FIG. 3, with continued reference to FIGS. 1 and 2, a flowchart of exemplary actions that may be performed by system 10 is illustrated. Process 300 may be used to perform two-way audio and video communications between a customer using customer terminal 20 and an attendant using an attendant workstation 60. The process can begin at 305 when a customer presses a call button 33 or otherwise notifies the attendant using customer terminal 20. The activation of the call button 33 can trigger audio interface 24 to send a message to the audio server 50 via network 80 requesting an audio communication session with an attendant (310). The audio server 50 may receive the request and forward it to a network address on network 80 associated with attendant audio interface 62 based on an identifier included in the request (e.g., the network address of customer audio interface 24) and additional information stored in the dial plan module 52 (step 315). In other words, the audio server 50, via the dial plan 52, can be configured to route requests originating from a specific customer terminal 20 to an assigned attendant workstation 60. A mapping of customer terminals to attendant workstations may be calculated or otherwise determined based on information stored in a database contained in the audio server 50 or other computer operatively connected to the audio server 50. For example the database containing the mappings may be stored within the attendant workstation 60 via the network 80. Once the audio interface 62 receives the request, it may respond with an acknowledgement message, wherein a two-way audio session may then be established between the customer terminal 20 and the attendant workstation 60 via the audio server 50 and network 80 (320).

The audio server 50 may be further configured to add additional information to the request when forwarding the request to attendant terminal 60. The additional data may optionally be contained within an encrypted file or data stream. In one example, the additional information includes the network address of video decoder 29 in the customer terminal 20. The processing hardware or software within attendant workstation 60 can then instruct video decoder 73 in the attendant terminal 60 (at 325) to establish a video communication session with the video camera 26 in the customer terminal 20 (at 330). At 335, the hardware or software within the attendant workstation 60 can further control the video decoder 29 (335) within the customer terminal 20 to establish a video communication session with the video camera 76 in the attendant workstation 60 (step 340).

In other embodiments, the additional information added by the audio server to the incoming requests may include codes or other instructions for identifying particular attributes relating to the business function of the customer terminal 20. For example, the additional information may include an identifier of the floorplan of a parking garage or a sample parking ticket image. Based on this information, the attendant workstation 60 can retrieve and display an image of the floorplan of the facility where the customer is located, a sample image of the equipment or terminal that the customer is using, or of a sample parking ticket from that facility for reference by the attendant during the communications session. The attendant workstation 60 can also be configured to retrieve and display transactional data related to the customer, and to control other functions related to the customer terminal (adjust required payment or rate, issue credit or refund to customer, display advertisement on display 28, start recording video, etc.). The additional information (e.g., floorplan, sample ticket, and the like) may be stored within a database or other memory structure within the attendant computer 79 or another computer operatively connected to the attendant workstation 60 such via network 80 or network module 85. In one embodiment, the floorplan or sample parking ticket can be displayed on the same display 72 with the image of the customer's face from the camera 26. In other embodiments, a separate display may be included with the attendant workstation, in addition to the display 72, for displaying the additional information. The attendant workstation 60 may also be configured to display other information related to the communications session, such as network latency, video frame rates, network bandwidth usage, and the like. The simultaneous two-way audio and video communications session can continue until the call is complete and the attendant signals that the session should be ended using the input devices 77 and/or 78 (step 345).

Because the video sessions between the video cameras and decoders can be maintained separately from the audio communication sessions (which may be routed through the audio server 50), an interruption in the flow of audio data need not affect the corresponding related flow of video data. Conversely, an interruption or delay in the video data need not affect the data rate or quality of the audio communications.

The video connections and data transfer between the video decoders and video cameras may be optionally maintained using a connectionless protocol, such as the User Datagram Protocol (UDP). As used herein, the term "connectionless protocol" shall be interpreted to mean a communication protocol wherein data sent by a sending device does not require a return confirmation response from the receiving device or retransmission of undelivered data. Connectionless protocol for the video transmission, delays due to acknowledgement signals or data retransmission are reduced.

The data transfer between the video decoders and video camera may utilize any suitable compression algorithm, such as MPEG-2, MPEG-4, DivX, H.264, H.265 or any other suitable compression algorithm useful to reduce the size and number of datagrams passed through the network thereby reducing the overall quantity of data exchanged as customers and attendants use system 10. For example, the compression algorithm may be an adaptive compression algorithm which may only transfer the portion of the data which has changed from a previous frame or datagram, thereby reducing the amount of data that needs to be transferred for the current frame. Any suitable compression algorithm may be used.

Turning now to implementation details, the customer terminal 20, attendant workstation 60, and audio server 50, may each optionally include one or more computer processors, such as processor 83, and memory (not shown) for retrieving, executing, and storing instructions and data according to the method described herein. Each processor may be comprised of one or more components configured as a single unit. One or more components of each processor may be of the electronic variety defining digital circuitry, analog circuitry, or both. In one embodiment, each processor is of a conventional, integrated circuit microprocessor arrangement, such as one or more CORE™ processors (including CORE 2 Duo, Core i3, Core i7 and the like) or PENTIUM 4® processors supplied by INTEL Corporation of 2200 Mission College Boulevard, Santa Clara, Calif. 95052, USA. It shall be appreciated that other processors manufactured by INTEL or other suppliers would be suitable for use with the system and method described herein.

Each memory disclosed herein is one form of a computer-readable device or medium. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

Network 80 and any network pathways 82, 84, or 86 defining any subnetworks discussed herein that may carry network datagrams between the components of system 10 may be connected via any suitable network over wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or a satellite band.

The wireless links may also include any cellular network standards used to communicate among mobile devices, including standards that qualify as 1G, 2G, 3G, 4G, and the like. The network standards may qualify as one or more generations of mobile telecommunication standards by fulfilling a specification or standards such as the specifications maintained by International Telecommunication Union (ITU). The 3G standards, for example, may correspond to the International Mobile Telecommunications-2000 (IMT-2000) specification, and the 4G standards may correspond to the International Mobile Telecommunications Advanced (IMTAdvanced) specification. Examples of cellular network standards include AMPS, GSM, GPRS, UMTS, LTE, LTE Advanced, Mobile WiMAX, and WiMAX-Advanced. Cellular network standards may use various channel access methods such as FDMA, TDMA, CDMA, SDMA and the like. In some embodiments, different types of data may be transmitted via different links and standards. In other embodiments, the same types of data may be transmitted via different links and standards. The geographical scope of network 80 and any network pathways such as pathways 82, 84, and 86 may vary widely. These networks and network pathways my constitute or include a Body Area Network (BAN), a Personal Area Network (PAN), a Local-Area Network (LAN) such as an organization's intranet, a Metropolitan Area Network (MAN), a Wide Area Network (WAN), or the Internet.

The topology of network 80 and any of the subnetworks discussed herein may be of any form and may include point-to-point, bus, star, ring, mesh, tree or other suitable arrangement. Any of the disclosed networks may be an overlay network which is virtual and sits on top of one or more layers of other networks. Any suitable topology may be employed.

The networks or network pathways disclosed herein may utilize different techniques and layers or stacks of protocols, including the Ethernet protocol, the Transmission Control Protocol/Internet Protocol (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including IPv4 and/or IPv6), link layer and any other such layers. The networks and network pathways disclosed herein may be a type of a digital network, broadcast network, a telecommunications network, a data communication network, or a computer network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the invention as described herein and/or by the following claims are desired to be protected.

For example, the client and/or server arrangements, user interface and display content, and/or data layouts as described in the examples discussed herein could be organized differently on one or more computers to include fewer or additional options or features than as portrayed in the examples and still be within the spirit of the invention.

What is claimed is:

1. A customer service communication system, comprising:
    a customer terminal including:
        a customer audio interface adapted to send customer audio data over a digital network, wherein the customer audio interface is coupled to the digital network, the customer audio interface accessible from the digital network using a customer audio network address associated with the customer audio interface;
        a customer video camera adapted to output customer video data to the digital network, wherein the customer video camera is coupled to the digital network, the customer video camera accessible from the digital network using a customer camera network address associated with the customer video camera; and
        a customer video display module adapted to accept attendant video data received from the digital network; wherein the customer video display module is coupled to the digital network, the customer video display module accessible from the digital network using a customer display network address associated with the customer video display module;
    an attendant workstation located remote from the customer terminal and including:
        an attendant audio interface adapted to send attendant audio data over a digital network, wherein the attendant audio interface is coupled to the digital network, the attendant audio interface accessible from the digital network using an attendant audio network address associated with the attendant audio interface;
        an attendant video camera adapted to output the attendant video data to the digital network, wherein the attendant video camera is coupled to the digital network, the attendant video camera accessible from the digital network using an attendant camera network address associated with the attendant video camera; and
    an attendant video display module adapted to accept an incoming video signal received from the digital network; wherein the attendant video display module is coupled to the digital network, the attendant video display module accessible from the digital network using an attendant display network address associated with the attendant video display module;
    an audio communications server coupled to the digital network, wherein the audio communications server is adapted to initiate an audio communication session using the digital network, and wherein the audio communication session directs customer audio data to the attendant audio interface, and the attendant audio data to the customer audio interface;

wherein the attendant workstation is adapted to direct the customer video camera to send the customer video data to the attendant video display module using the digital network when the audio communication session has been initiated; and wherein the attendant workstation is adapted to direct the attendant video camera to send the attendant video data to the customer video display module using the digital network when the audio communication session has been initiated.

2. The system of claim 1, wherein the customer audio network address, the customer camera network address, and the customer video network address are different network addresses separately accessible via the digital network.

3. The system of claim 1, wherein the attendant audio network address, the attendant camera network address, and the attendant video network address are different network addresses separately accessible via the digital network.

4. The system of claim 1, wherein the customer terminal includes a self-pay parking terminal.

5. The system of claim 2, wherein the self-pay parking terminal includes a ticket reader, a payment acceptor, and a receipt printer.

6. The system of claim 5, wherein the attendant workstation is configured to control at least one function of the ticket reader, payment acceptor, and/or receipt printer.

7. The system of claim 1, wherein the customer terminal includes a customer detector and an automatic dialer; wherein the automatic dialer is configured to automatically request an audio communication session be initiated by the audio communication server when the presence of a customer is detected by the customer detector.

8. The system of claim 1, wherein the audio server is configured to add additional data to an electronic request received from the customer terminal before sending the request to the attendant workstation.

9. The system of claim 8, wherein the additional data comprises instructions to establish a video communication session between the customer video camera and the attendant video display module.

10. The system of claim 8, wherein the additional data comprises instructions to establish a video communication session between the attendant video camera and the customer video display module.

11. The system of claim 1, where the customer video display module includes a customer video decoder and a customer display, the customer video decoder configured to convert the customer video data received via the digital network to a video format suitable for output on the customer display.

12. The system of claim 1, where the attendant video display module comprises an attendant video decoder and an attendant display, the attendant video decoder configured to convert customer video data received via the digital network to a video format suitable for output on the attendant display.

13. The system of claim 12, wherein the attendant workstation includes a beam splitter arranged and configured to display a video image output by the attendant display in front of a lens of the attendant video camera.

14. The system of claim 1, wherein the customer video data and the attendant video data is transmitted over the digital network using a connectionless network protocol.

15. The system of claim 14, wherein the connectionless protocol is UDP.

16. The system of claim 1, wherein the customer video data and the attendant video data is transmitted over the digital network using an adaptive compression algorithm.

17. The system of claim 16, wherein the adaptive compression algorithm is H.264.

18. The system of claim 1, wherein the attendant video display module is configured to display transactional data related to a customer transaction.

* * * * *